US005360235A

United States Patent [19]

Drummeter et al.

[11] Patent Number: 5,360,235

[45] Date of Patent: Nov. 1, 1994

[54] SECRET OPTICAL MARKING

[75] Inventors: Louis F. Drummeter, Washington, D.C.; Gordon L. Stamm, Oxon Hill, Md.; Gerald E. Rohl, Woodbridge, Va.; Alfred G. Rockman, Brandywine, Md.

[73] Assignee: The United States of America as represented by the Secretary of the Navy, Washington, D.C.

[21] Appl. No.: 870,568

[22] Filed: Nov. 1, 1969

[51] Int. Cl.[5] .......................... B42D 15/00; G09C 3/00

[52] U.S. Cl. .......................... 283/89; 283/91; 380/54

[58] Field of Search .......................... 40/1, 5, 2, 137; 35/2; 89/1; 178/22; 179/1.5; 250/83.3; 350/1, 172, 283, 290; 283/87, 89, 91; 386/54; 382/17

[56] References Cited

U.S. PATENT DOCUMENTS 1,385,657 7/1921 Bell et al. .
2,929,931 3/1960 Richter et al. .
3,048,697 10/1962 Cavanaugh et al. .................. 250/71
3,068,010 12/1962 Nagopian .................. 380/54
3,234,663 2/1966 Ferris et al. .................. 35/2
3,279,826 10/1966 Rudershausen et al. .
3,455,577 7/1969 Kikumoto .................. 283/89
3,473,864 10/1969 Garbeny .
3,535,022 10/1970 Duchateau et al. .................. 359/290
3,640,009 2/1972 Komyama .................. 283/87

*Primary Examiner*—Nelson Moskowitz
*Attorney, Agent, or Firm*—Thomas E. McDonnell; Charles J. Stockstill

[57] ABSTRACT

An optical marking system in which objects are coated with materials for the purposes of applying secretly coded marks on the objects. The coating materials are transparent in daylight and have the property of absorbing ultraviolet light. When such materials are applied to a portion of the surface of an object which is a good ultraviolet reflector, only the uncoated portion reflects ultraviolet. Thus, the marked object is therefore seen as having the coated portion blocked-out when viewed through a device which filters out all but ultraviolet wavelengths but appears to be unmarked when observed without the viewing device. Similar coding of objects may be achieved by appropriately selected paints, papers and other materials.

9 Claims, 1 Drawing Sheet

SECRET OPTICAL MARKING

STATEMENT OF GOVERNMENT INTEREST

The invention described herein may be manufactured and use by or for the Government of the United States of America for governmental purposes without the payment of any royalties thereon or therefor.

BACKGROUND OF THE INVENTION

The present invention relates to identification systems and methods, and more particularly to marking systems wherein identification marks are applied on preselected objects in such manner that the marks are not visible when viewed by the unaided eye but may only be observed under controlled conditions.

In the past, certain materials, which are often referred to as "invisible inks", have been used for a variety of purposes, such as the marking of checks, bank notes, bonds and other negotiable instruments so that any fraudulent alterations of the instruments may be detected. Invisible inks have also been used to mark laundry, to identify contents of containers and to authenticate identification badges. Although such marking systems have been satisfactory for most of the uses mentioned, there has developed a need for a secret marking system having a greater degree of security against detection. In all known instances wherein such invisible inks have been used in the past, the inks have been made of a material which has the characteristic of fluorescing when exposed to intense ultraviolet. Since the ultraviolet light that is available in daylight is not of sufficient intensity to cause fluorescence, these materials appear to be transparent and invisible in daylight. However, when exposed to intense ultraviolet radiation, these materials fluoresce and emit radiation in the visible spectrum which then is observable with the unaided eye.

Marking materials which fluoresce are not suitable for clandestine operations because any material which radiates in the visible spectrum when illuminated by ultraviolet could be noticed by the casual observer. Another reason that fluorescent type marking materials are not suitable for most military applications is that the necessarily high illumination intensity requirements make distant illumination and viewing impractical.

There are many instances when it is imperative that the presence of the mark be concealled from everyone except the person or persons who supplied the marks. In military operations, for example, it may be desirable to place registration plaques on all non-military boats, operating in a particular geographic area and then superimpose the invisible marking system of this invention on certain of those plaques to identify only those boats. With the identification system of this invention, all boats would bear registration plaques which appeared to be identical to the plaques on other boats but only the suspect boats would have the invisible secret mark superimposed on the plaque.

SUMMARY OF THE INVENTION

The general purpose of this invention is to provide a new and improved optical identification system which includes all of the advantages of similarly employed systems and yet possesses none of the aforedescribed disadvantages. To attain this, the present invention contemplates a marking system which utilizes surfaces of ultraviolet absorbing and ultraviolet reflecting materials either adjacent one another or partially superimposed on one another. When viewed by the unaided eye, the entire surface area of both materials may be seen, but when viewed through a viewing device which filters out all but ultraviolet wavelengths, only the ultraviolet reflecting surface is seen while the ultraviolet absorbing surface appears to be blacked out. The materials used ay be lacquers, paints, papers and other materials.

It is therefore an object of the present invention to provide a new and improved optical marking system.

Another object is to provide a marking system by which objects may be secretly marked and observed without detection by unauthorized personnel.

A further object of the invention is to provide a method of secretly marking objects in such a manner that the mark cannot be observed by the casual observer with the unaided eye.

Another object is to provide a secretly coded optical marking system which does not require artificial illumination during daylight viewing.

A further object is to provide a secretly coded optical marking system by which the code may be observed at long distances with only low intensity radiation.

BRIEF DESCRIPTION OF THE DRAWINGS

The exact nature of this invention as well as other objects and advantages thereof will be readily apparent from consideration of the following description taken in conjunction with the accompanying drawing in which.

DESCRIPTION OF PREFERRED EMBODIMENT

Figure 1:
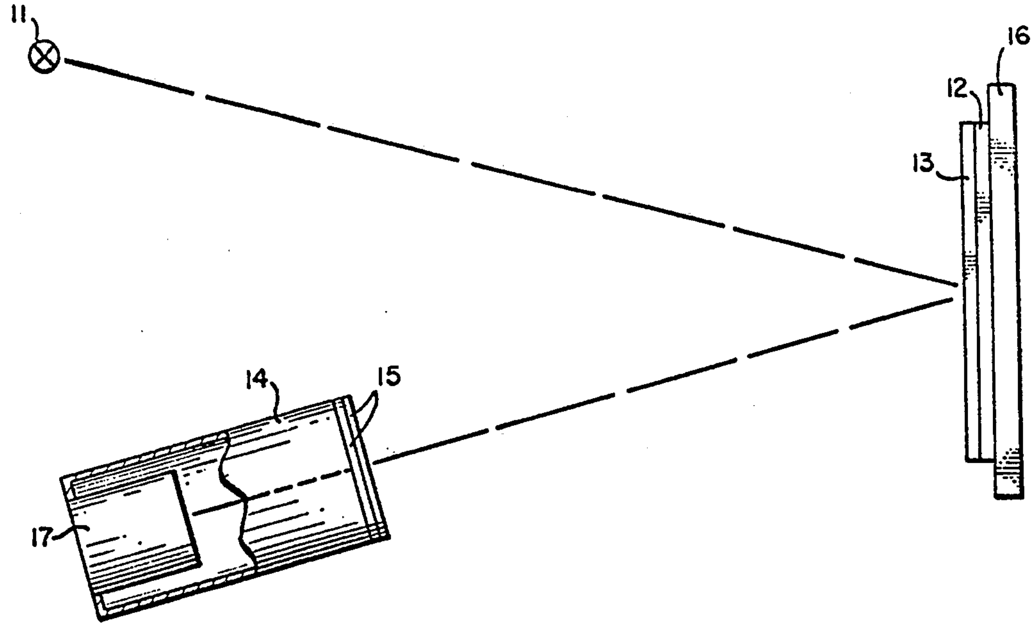
FIG. 1 is a diagrammatic illustration of the marking system of this invention.

Referring now to FIG. 1 of the drawings, the invention is shown as having light source 11 that includes ultraviolet light, an ultraviolet reflecting material 12, a transparent coating of ultraviolet absorbing material 13, and a viewing device shown generally at 14. The viewing device has an appropriate optical filter 15 which filters out all wavelengths above and below the ultraviolet band, thus permitting the viewing device to transmit only ultraviolet wavelengths. Material 12 is shown as being applied on or attached to a plaque or support 16 which, for example, could be attached to a vessel. The material 12 is a good reflector of both ultraviolet and visible wavelengths, while the material 13 has the property of being transparent at visible wavelengths and of absorbing rather than reflecting ultraviolet wavelengths.

Figure 2A:
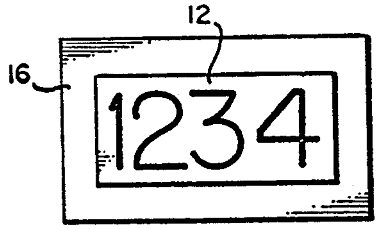
FIG. 2A shows a representative marked plate when viewed in daylight by the unaided eye.
Figure 2B:
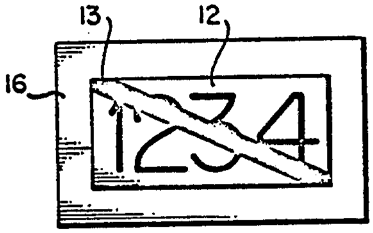
FIG. 2B shows the representative marked plate of FIG. 2A when viewed in daylight through an appropriate viewing device.

FIG. 2A illustrates a secretly coded marker as viewed in visible light without the aid of viewing device 14. The entire surface area of material 12 reflects visible light and therefore is observed by the unaided eye, as seen in FIG. 2A, with the numerals 1, 2, 3, 4 thereon being representative of a typical registration marker. The ultraviolet absorbing coating 13 is not seen by the unaided eye in FIG. 2A because coating 13 is transparent at visible wavelengths while the entire area covered by material 12 on the plaque reflects visible light.

When observed at ultraviolet wavelengths through viewing device 14 however, the plaque is seen as having a diagonal black stripe thereon. The black stripe is caused by the presence of the ultraviolet absorbing material 13 being applied diagonally on the plaque, since material 13 absorbs ultraviolet rather than reflects ultraviolet, while the remainder of the surface covered by material 12 reflects ultraviolet, the reflected ultraviolet image appears as having a black stripe extending diagonally thereacross. The coded mark made by material 13 is thus visible only when observed through viewer 14.

At this point it should be noted that, since viewer 14 is made sensitive to only ultraviolet, it is necessary to employ an image conversion device 17 with the viewing device for converting the ultraviolet image to a visible image. In one form, an ultraviolet sensitive film may be employed, for example, Polaroid film, to convert the ultraviolet image to a visible image. Several types of military viewing devices may also be used as the image converter such as the Metascope, the Starlight Scope, and the Night Observation Device.

Various materials and compositions may be employed as the ultraviolet reflecting material 12. Some materials which have been found to work satisfactorily are white paint with a zinc sulfide pigment, aluminum lacquer, aluminized metal surfaces, steel and certain grades of white paper.

Various materials may also be used for the ultraviolet absorbing material 13. Good ultraviolet absorbing materials which are not transparent are white paint with a titanium dioxide pigment and certain grades of white paper. Many of the substituted benzophenones, such as those sold by General Aniline and Film Corp., American Cyanamid Company and Monsanto Chemical Co. are also good ultraviolet absorbing materials. Some of the useful benzophenones are 2,4 dihydroxybenzophenone, 2-hydroxy-4-methoxybenzophenone, 2,2′,4,4′-tetrahydroxybenzophenone, 2,2′-dihydroxy-4,4′-dimethoxybenzophenone and mixtures thereof sold under a known trademark, "Uvinul", and being solids, M.P. 60°-200° C. or more. The desired characteristic of a good ultraviolet absorbing material is that its spectral reflectance curve should decrease abruptly toward zero percent reflectance within a narrow wavelength range close to 400 nm.

It is understood that various ultraviolet reflecting materials may be combined with various ultraviolet absorbing materials. A particularly good combination of materials is white paint with a zinc sulfide pigment as the reflector and white paint with a titanium dioxide pigment as the absorber. These materials are nearly identical in appearance when viewed in visible light but contrast sharply with one another when viewed in ultraviolet. When using various combinations of ultraviolet absorbing and reflecting materials, it has been found that some of the ultraviolet absorbing materials differ slightly in glossiness form certain of the ultraviolet reflecting materials under close inspection. This difference in glossiness may easily be concealled by feathering the edges of the coatings, lapping the coatings or applying a transparent acrylic lacquer which has been flatted by including diatomaceous silica over the entire surface as a diffusing outer cost.

From the foregoing description, it is apparent that the present invention provides a new and improved method of identifying objects having secret optically coded marks thereon. A principal advantage of this invention is that the method may be practiced utilizing only the ultraviolet radiation available in natural daylight, thus eliminating the need for artificial searchlights except for nighttime viewing. It has been found that adequate amounts of ultraviolet radiation are provided by daylight even under overcast and dark skies. For viewing at night, a 150-watt xenon-arc searchlight has been used successfully. The invention may be practiced with low intensity ultraviolet sources, such as daylight or low power artificial sources, because the invention does not incorporate fluorescent marking materials which require intense ultraviolet sources. The present invention offers a greater amount of security against detection than other marking systems because the coded mark may only be seen with the aid of special viewing equipment. Even when illuminated by ultraviolet, the coded mark remains invisible in the visible spectrum.

It is to be understood that various modifications and variations of the present invention are possible in view of the above teachings. For example, with proper selection of materials which reflect and absorb infrared wavelengths and appropriate viewing filters, a secretly coded marking system could be produced using infrared wavelengths. It is therefore understood that, within the scope of the appended claims, the invention may be practiced otherwise than as specifically described.

What is claimed and desired to be secured by letters patent of the United States is:

1. A method identifying objects with coded marks comprising the steps of:

affixing a first material to said object for reflecting radiation in a non-visible wavelength band, covering a portion of said first material with a second material which does not reflect radiation in said wavelength band, illuminating both materials with radiation in said wavelength band, and observing the reflected radiation through an optical filter which transmits only said wavelength band.

2. The method of claim 1 wherein said second material is transparent at visible wavelengths.

3. The method of claim 2 further including the step of applying a continuous coating of a transparent third material over both said first and second materials.

4. The method recited in claim 1 further comprising:

converting the reflected radiation transmitted through said filter from a non-visible image to a visible image.

5. The method of claim 4 wherein the reflected radiation is converted to a visible image by a photographic process.

6. The method of claim 4 wherein the reflected radiation is converted to a visible image by an electronic image conversion tube.

7. The method of claim 4 wherein said first material is a good reflector of ultraviolet radiation and said second material is a poor reflector of ultraviolet radiation.

8. The method of claim 7 wherein said first material is zinc sulfide and said second material is titanium dioxide.

9. The method of claim 7 wherein said second material is an ultraviolet absorbing benzophenone and further including the step of applying a continuous coating of a transparent acrylic lacquer, which has been flatted with diatomaceous silica, over both said first and second materials.

* * * * *